United States Patent
Diezmann et al.

[11] Patent Number: 6,044,046
[45] Date of Patent: Mar. 28, 2000

[54] CD WITH BUILT-IN CHIP

[75] Inventors: Nils Diezmann, Ebersberg; Klaus Finkenzeller, Munich, both of Germany

[73] Assignee: Giesecke & Devrient GmbH, Munich, Germany

[21] Appl. No.: 09/147,195

[22] PCT Filed: Apr. 22, 1997

[86] PCT No.: PCT/EP97/02034

§ 371 Date: Jan. 28, 1999

§ 102(e) Date: Jan. 28, 1999

[87] PCT Pub. No.: WO97/41562

PCT Pub. Date: Nov. 6, 1997

[30] Foreign Application Priority Data

Apr. 26, 1996 [DE] Germany ............ 196 16 819

[51] Int. Cl.⁷ .................................................. G11B 13/00
[52] U.S. Cl. .............................................. 369/14; 369/273
[58] Field of Search ............................ 369/14, 273, 272, 369/15; 360/133, 135, 137

[56] References Cited

U.S. PATENT DOCUMENTS

| | | | |
|---|---|---|---|
| 4,814,924 | 3/1989 | Ozeki | 360/133 |
| 4,868,373 | 9/1989 | Opheji et al. | 235/380 |
| 4,910,625 | 3/1990 | Albrecht et al. | |
| 5,012,380 | 4/1991 | Harissis et al. | |
| 5,119,353 | 6/1992 | Asakura | 369/13 |
| 5,235,586 | 8/1993 | Feamster et al. | 369/100 |

FOREIGN PATENT DOCUMENTS

44 03 206 A1  8/1995  Germany .

*Primary Examiner*—Tan Dinh
*Attorney, Agent, or Firm*—Bacon & Thomas

[57] ABSTRACT

A data carrier in the form of a write-once or rewritable compact disc (CD) includes a circular CD body with an information-carrying layer and a chip integrated in the CD body, the CD further including at least one CD coupling element for noncontact transfer of data between the chip and a data processing device, and of power from the data processing device to the chip. The CD coupling element can be implemented as a coil, an electrostatic coupling surface, or an optical coupling element. For reading out the information applied to the information-carrying layer of the CD, the CD can be inserted into a CD drive. The CD drive has a drive coupling element which, in correspondence with the CD coupling element, is likewise formed as a coil, an electrostatic coupling surface, or an optical coupling element and sends data to the CD coupling element or receives data therefrom. The CD coupling element may be integrated in the CD body or in a pressure plate of the CD drive which rotates with the CD and contacts contact surfaces disposed on the CD to make an electrical connection with the chip.

35 Claims, 8 Drawing Sheets

CD WITH BUILT-IN CHIP

BACKGROUND OF THE INVENTION

This invention relates to a data carrier in the form of a CD-ROM or rewritable CD usually consisting of a circular CD body with an information-carrying layer applied thereto.

The CD is nowadays a mass product which is used for example as a storage medium in computer technology. It is a storage medium on which data and programs, such as system software or computer games, are normally stored permanently during production of the CD. A currently especially widespread embodiment of the CD is one which is only once writable and therefore designated a CD-ROM. The memory content of such a CD, hereinafter referred to as information, can be read out completely and not changed. In particular, no data can be added and no temporary results stored on the CD. CDs are also available which can be rewritten. However, it is frequently undesirable to write temporary results or other temporary data to the same storage medium in which programs, computer games or the like are already permanently stored. Such data will therefore normally be stored on an attached computer. That means that the CD can only be used with this specific computer if the stored temporary results must be reused for processing. It is of course also possible to store the temporary results on a separate storage medium, such as a minidisk, and henceforth leave them with the CD. The CD and the separate storage medium can then be used in any computer which has two suitable interfaces therefor. If the separate storage medium gets lost, however, one simultaneously loses all temporary results irretrievably.

A similar problem arises in connection with the execute or copy protection of information stored on the CD. For the purpose of execute or copy protection of CDs it is known to produce CDs in such a way that they are readable only with additional hardware. The information on the CD can e.g. be encrypted and the additional hardware can contain the data or algorithms necessary for decryption. The additional hardware usually consists of a smart card with e.g. user-specific data and/or the keys or algorithms making it at all possible to decrypt the information stored on the CD. If the smart card gets lost, however, the information stored on the CD can no longer be used. Such a copy protection method is known from DE-A-44 19 115. Here, the execution of software stored on a secondary storage medium is only allowed after legitimation has been performed by means of a smart card introduced for this purpose into a card reader connected with the computer.

A further disadvantage of storing additional and possibly variable data outside the CD on a separate data carrier is that concurrent processing of the CD information and the data of the separate data carrier requires two accordingly designed interfaces. This requires relatively great technical effort.

EP 0 230 069 B1 discloses a smart card having a rotationally symmetric optical storage beside a microchip. The chip can contain a memory (RAM) and a processor which makes it at all possible to read out coded optical storage data. The purpose of the smart card with the rotationally symmetric optical storage is that a rotating storage medium can be read out faster than the magnetic stripes known up to then could be read out translationally line by line. According to this teaching a storage medium known in smart card technology is thus replaced by a storage medium which is completely novel in the field, a rotationally symmetric optical storage. Communication with the chip disposed beside the optical storage is only possible, however, as long as the smart card is not yet rotating. Simultaneous readout of the optical storage and communication with the chip is not possible.

SUMMARY OF THE INVENTION

The present invention is directed to a CD and based on the problem of providing a CD which it makes possible to store not only the information stored on the CD but also further individual data, such as temporary results, algorithms and keys, which can be read out and optionally changed. Further problems of the present invention are to provide a method for producing such a CD and to provide an apparatus for writing the additional data to the CD and reading them from the CD.

This problem is solved according to the invention by integrating into the CD a monolithic integrated circuit, hereinafter referred to as a chip, and a CD coupling element for noncontact transfer of data between the chip and a data processing device. The chip and the CD coupling element are preferably disposed between the center hole of the CD and the innermost data track. In a variant of the invention, the CD coupling element is integrated not into the CD but into one of the two pressure plates of the CD drive which are pressed against the CD from each side. One of these pressure plates is connected with an electric motor and sets the CD rotating. The other pressure plate serves as a support. The pressure plate containing the CD coupling element is provided with contacts. These contacts are pressed against corresponding contact surfaces on the surface of the CD which are electrically connected with the terminals of the chip. This variant has the advantage that the CD must merely be equipped with contact surfaces since noncontact data transfer to the data processing device is effected via the CD coupling element integrated in the pressure plate.

The chip integrated into the CD is formed as a mere memory chip if e.g. only temporary results are to be stored. In an advantageous embodiment, the chip is formed as a processor chip on which algorithms run or security structures can be realized in order to permit copy and execute protection for software or access control to data on the CD. This ensures that the information stored on the CD can be processed correctly or at all. One will normally select a chip with data processing taking place via electric signals. However, it is also conceivable to use optical chips with processing of optical signals. Optical chips are currently only starting to be developed, but can be of interest within the framework of the present invention in particular for the embodiments in which the data exchange between the chip and the data processing device is likewise effected by means of optical signals.

The CD coupling element preferably consists of a coil which is electrically connected with the chip, optionally via the contacts of the pressure plate and the contact surfaces on the CD surface. The coil permits noncontact transfer of data, power and the system clock between the chip and a second coil connected with the data processing device, hereinafter referred to as the drive coupling element. The CD coupling element can be potted in a suitable resin together with the chip to form a fixed module or be laminated and received in a corresponding gap of the CD body. This gap is preferably already taken into account during production of the CD body but can also be milled out of the CD body only in a following process. The module is fixed in the gap chemically or physically, for example by means of an adhesive or lacquer, but can also have been connected with the CD body thermally if the material used for module production is compatible with the material of the CD body. A further possibility of integrating the finished module into the CD body is to insert the module into the injection mold during CD production and mold it when the information-carrying plastic layer is being produced on which a reflective metal layer is vaporized or another suitable storage medium provided. Instead of the finished module, one can also use a stabilized blank consisting of CD coupling element and chip as well as a material which gives the formation enough hold to withstand the injection molding process without damage.

If the CD is a CD-ROM with the information applied in the form of a reflective metal layer, the CD coupling element can also be designed so as to be part of the reflective metal layer of the CD, whereby this part should be electrically separate from the rest of the reflective metal layer with the optically readable data tracks. In this case only the chip would of course be inserted into the CD body in one of the ways described above.

As an alternative to the coil permitting data, power and system clock for the chip to be transferred inductively, the CD coupling element can also be implemented as a dipole antenna permitting electromagnetic waves to be transmitted. The electromagnetic waves can likewise transfer data, power and system clock.

Further, the CD coupling element can be formed as a capacitive coupling surface. This capacitive coupling surface permits noncontact data transfer in connection with the drive coupling element disposed outside the CD. The capacitive coupling surface of the CD coupling element can be formed e.g. by the reflective metal layer of the CD. Since the capacitive coupling surface is unsuitable for simultaneous transfer of power, the CD must in this case either be equipped with its own power source for supplying power to the chip, e.g. an integrated battery, or an additional coupling device must be provided for transferring power from an external power source to the chip, whereby the additional coupling device can be a further capacitive coupling surface or a coil.

In further embodiments, the CD coupling element is designed so as to permit optical or acoustic data transfer or, in special cases, data transfer by means of charged physical particles. Depending on the specific circumstances, the power transfer and/or the transfer of the system clock can also be effected via one of the stated transmission paths.

The CD coupling element can also be part of the circuit integrated on the chip. Such a chip can be housed e.g. in a milled gap in the CD body and potted with resin therein. In this case it might be necessary to ensure a sufficiently high data transfer rate between the chip and the data processing device by mounting a plurality of drive coupling elements on the same radius on which the chip of the CD is also disposed. The apparatus for communication between the inventive CD and the data processing device consists of a CD drive with two pressure plates between which the CD is clamped and which set the CD rotating. The CD drive further has a device for reading the data tracks of the rotating CD and a drive coupling element for noncontact data transfer to and from the CD coupling element.

The drive coupling element is also formed in accordance with the CD coupling element as a coil, a dipole antenna and/or one or more capacitive coupling surfaces or in a form suitable for optical or acoustic coupling or for coupling via charged physical particles. The drive coupling element is preferably disposed above the pressure plate serving as a support since there is less room available on the side of the motor-side pressure plate. On a guide plate for the support-side pressure plate one can provide a gap or tabs for mounting the drive coupling element.

The drive coupling element can be packed in a flexible annular or circular foil with an integrated flexible connecting cable with a connector and be disposed in this way in the CD drive. Alternatively, the drive coupling element can be housed in or on a rigid annular or circular carrier by being either printed on a board or potted with resin to form a drive module like the CD coupling element. The connection with the board can be effected via a data bus in flexible foil or via insulated cables and be either soldered or plugged. The connection with the potted drive module can likewise be effected via flexible foil or cables if the latter are welded directly with the drive module or connected therewith with a connector during production of the drive module.

Communication between the data processing device and the chip, on the one hand, and the data processing device and the device for reading the CD information, on the other hand, can be effected either via two completely separate connections or via a common connection with an interposed logic device which can have both hardware and software elements.

In the latter case the data processing device, e.g. a PC, is connected with the logic device, and in the logic device either a connection is made with the chip via the drive coupling element and CD coupling element or a connection is made with the CD readout device. This specifically means that communication from the PC to the chip is effected via the same data line as information transfer between PC and CD, i.e. one uses e.g. an IDE or SCSI bus. The addresses used can be CD addresses (positions and sectors). The chip is then addressed via those CD addresses which are not realized or cannot be realized on the CD or which are reserved for future uses. It is also conceivable for different addresses to be provided for CD data and chip data. The logic device then decides by the address whether the communication blocks are sent to the CD readout device or to the chip. This also means that the data sent to the chip must be transformed for example into radiofrequency (RF) signals suitable for data transfer between the drive coupling element and the CD coupling element. This transformation takes place in an RF unit disposed between the logic device and the drive coupling element. Both the logic device and the RF unit are housed in the CD drive as independent elements.

In the other case in which communication between PC and chip is effected via a separate data line, i.e. separately from the communication between PC and CD, the PC addresses the chip via an interface inside the PC. One can use for this purpose a PC card on which the RF signals intended for the chip can be processed. That is, most of the hardware for communication with the chip is located on the PC card and need not be integrated into the drive. The hardware of the PC card could also be integrated in the PC motherboard.

In an especially advantageous embodiment there is no hardware distinction between data transfer to or from the chip and data transfer to or from the CD-ROM. In both cases data transfer is effected by means of the device for reading out the CD information, i.e. optically. The CD coupling element is to be designed so as to permit optical coupling. No separate drive coupling element is required since this task is performed by the device for reading out the CD information. Data transfer to or from the CD-ROM and to or from the chip is effected via one and the same transmission path.

In a further embodiment of the invention, the apparatus for communication between the CD and the data processing device has a device for receiving additional information from a second information carrier. The second information carrier can be e.g. a smart card, noncontact or with contact surfaces, with which controlled access to the PC can be realized.

The invention will be explained in the following by way of example with reference to a CD-ROM. However, one can similarly use a rewritable CD, such as a magneto-optic CD or optically writable CD.

DETAILED DESCRIPTION OF THE PREFERRED EMBODIMENTS

Figure 1:
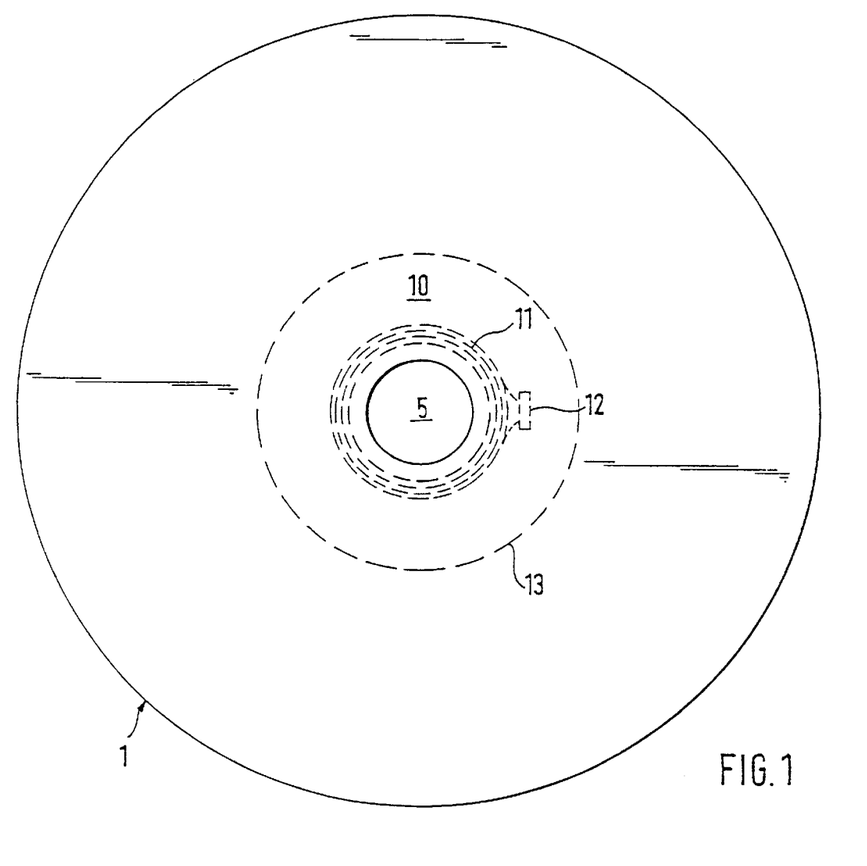
FIG. 1 shows a plan view of an embodiment of the inventive CD-ROM.
Figure 2:
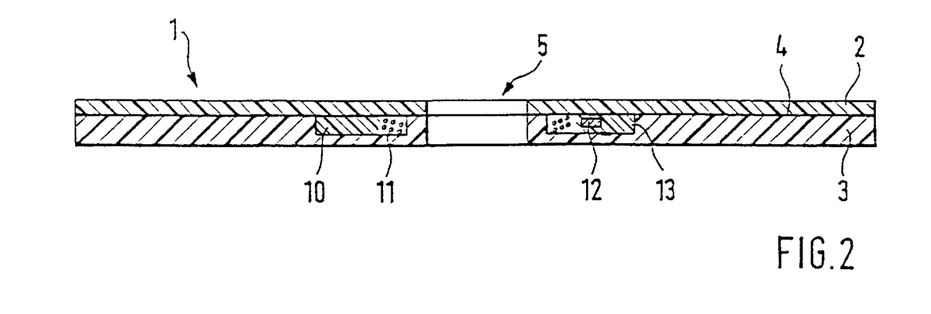
FIG. 2 shows the CD-ROM of FIG. 1 from the side in cross section.

FIG. 1 and FIG. 2 show an embodiment of the inventive CD-ROM. CD body 1 consists substantially of three layers, i.e. information-carrying layer 3, metal layer 4 usually of aluminum vaporized on the information-carrying side of layer 3, and protective lacquer layer 2 disposed thereabove for sealing metal layer 4 from external influences. In the middle of the CD there is CD center hole 5 which can be engaged by motor-side and support-side pressure plates of a CD drive. As indicated by FIG. 2, annular module 10 is disposed in information-carrying layer 3 centrally around CD center hole 5 and fitted exactly into gap 13 of CD body 1. Embedded in module 10 in the shown embodiment are CD coupling element 11 implemented as a coil and chip 12. To increase stability, gap 13 can be separated from center hole 5 by a narrow bar.

Production takes place as follows: First, information-carrying layer 3 is injection molded from plastic. Gap 13 and center hole 5 are preferably molded directly at the same time, but can also be milled out in a following process. Module 10 can be inserted into gap 13 in the form of a prefabricated cast resin ring and connected permanently with information-carrying layer 3 by means of an adhesive or lacquer or else thermally. Metal layer 4 is then vaporized on information-carrying layer 3 and module 10. Then protective lacquer layer 2 is applied.

In the production method described above, the dimensions of gap 13 and the module dimensions with respect to the inside and outside edges of gap 13 are critical insofar as one must ensure that module 10 assumes an exactly central position. The thickness of module 10 is less critical since tolerances are compensated by protective lacquer layer 2 disposed thereabove. It is not necessary for vaporized metal layer 4 to cover module 10 since CD-ROM 1 has no data tracks in this area. However, in this area metal layer 4 can perform the function of CD coupling element 11 and be designed for example in the form of a coil which is electrically separate from the rest of metal layer 4 and electrically connected in suitable fashion with chip 12 embedded in module 10. In the embodiment shown in FIG. 1 and FIG. 2, however, CD coupling element 11 is integrated in module 10 as a wound coil together with chip 12.

Besides the above-described way of producing CD-ROM 1 with integrated module 10, there is a second way of integrating module 10 into the CD body. Module 10 is thus inserted into the injection mold of information-carrying layer 3 and the material for information-carrying layer 3 then injected. In this method none of the outside dimensions of module 10 are especially critical since all dimensional inaccuracies are compensated by the injected material of information-carrying layer 3. Only in an embodiment in which gap 13 of CD-ROM 1 is not separated from center hole 5 by a bar is it necessary to execute very exactly the center bore of module 10 through which the module is automatically centered in the injection mold. Instead of module 10 one can also insert into the injection mold a blank consisting of a chip and a coil as well as a material for stabilization thereof.

Figures 3, 4:
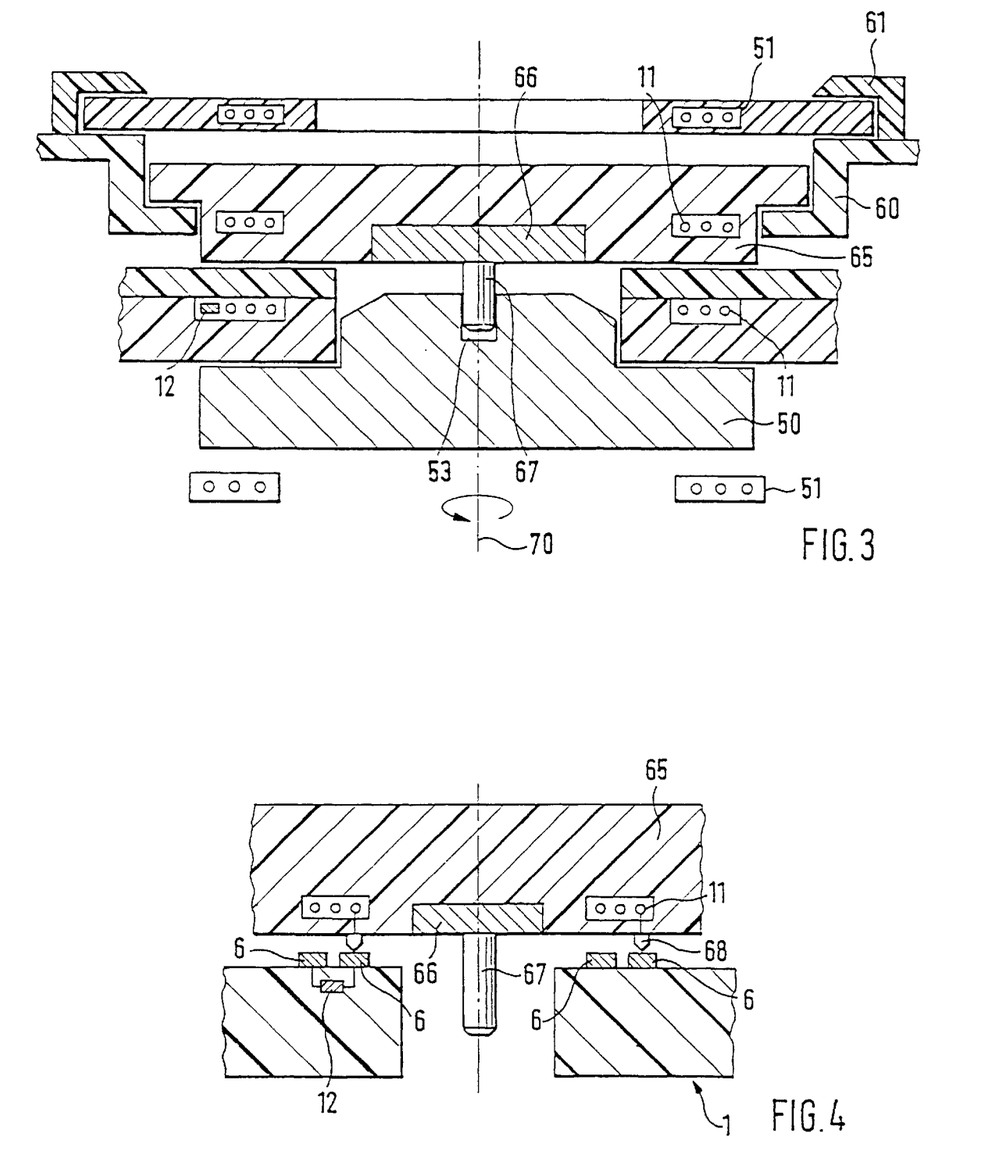
FIG. 3 shows an inventive CD-ROM in a CD drive with two differently disposed drive coupling elements.
FIG. 4 shows a detail of the inventive CD-ROM with the support-side pressure plate mounted thereon.

FIG. 3 shows by way of example how CD-ROM 1 can be clamped in a CD drive between motor-side pressure plate 50 and support-side pressure plate 65, the CD including pressure plates 50 and 65 being rotatable around axis 70. Motor-side pressure plate 50 is driven by an electric motor (not shown). The bearing pressure clamping CD-ROM 1 between pressure plates 50 and 65 can be produced by annular permanent magnet 66 integrated in support-side pressure plate 65 and exerting magnetic attraction on opposite motor-side pressure plate 50. Support-side pressure plate 65 has in its center pin-shaped projection 67 which engages depression 53 of motor-side pressure plate 50, thereby centering support-side pressure plate 65. Support-side pressure plate 65 is pivoted in guide plate 60. The periphery of the CD drive is omitted for simplicity's sake.

Drive coupling element 51 consists for example of a coil cast in a synthetic resin ring, being disposed above support-side pressure plate 65 and fastened to guide plate 60 via projection 61 or glued to guide plate 60 by an adhesive. A flexible connecting cable is guided out of guide plate 60 from drive coupling element 51, past the mechanics of the CD drive close to one of the housing sides of the CD drive, and plugged onto a board from which the data are passed on (not shown). Drive coupling element 51 can in principle also be disposed below motor-side pressure plate 50. But this position will normally be less favorable for reasons of space since the electric motor for driving CD-ROM 1 is also housed here.

For the arrangement of CD coupling element 11, FIG. 3 likewise shows two alternatives. CD coupling element 11 can either be integrated in module 10 of the CD-ROM or be integrated in support-side pressure plate 65. In the latter case an electric connection is made between chip 12 of CD-ROM 1 and CD coupling element 11 via contacts 68 on the face of support-side pressure plate 65 and corresponding contact surfaces 6 on the upper side of CD-ROM 1. The contacting between CD-ROM 1 and support-side pressure plate 65 is shown in detail in FIG. 4.

FIG. 4 shows a sectional view of a detail of CD-ROM 1 and support-side pressure plate 65 mounted thereon. Two annular contact surfaces 6 electrically connected with chip 12 are applied in a concentric arrangement to the upper side of CD-ROM 1. The lower side of support-side pressure plate 65 has contacts 68 which are connected with CD coupling element 11 and pressed against contact surfaces 6 by the bearing pressure produced by permanent magnet 66.

Figure 5A:
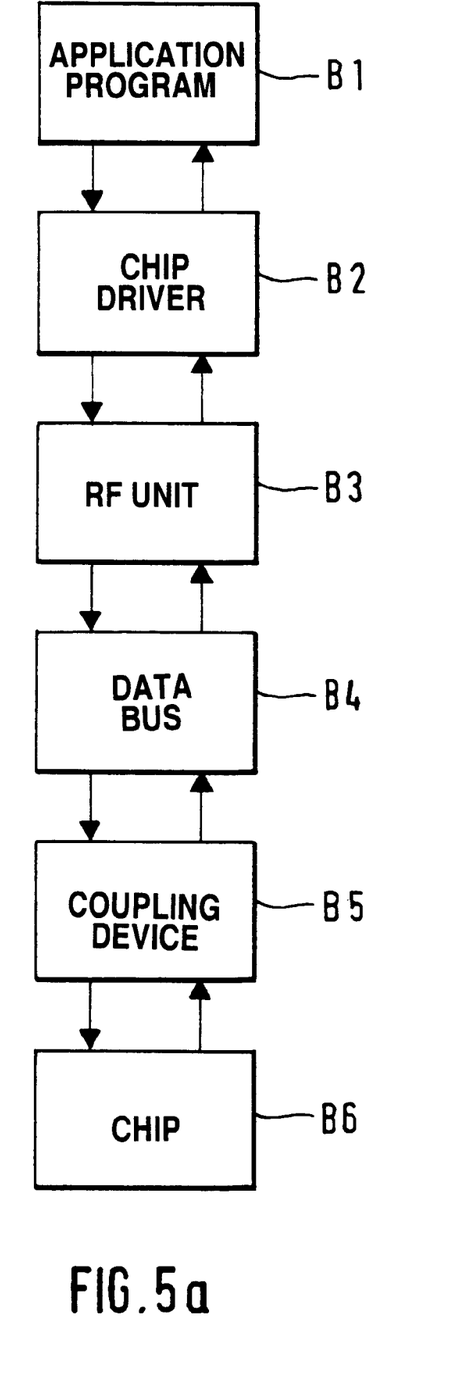
FIGS. 5a, 5b show a block diagram and flow chart to illustrate communication between an inventive CD-ROM and a data processing device.
Figure 5B:
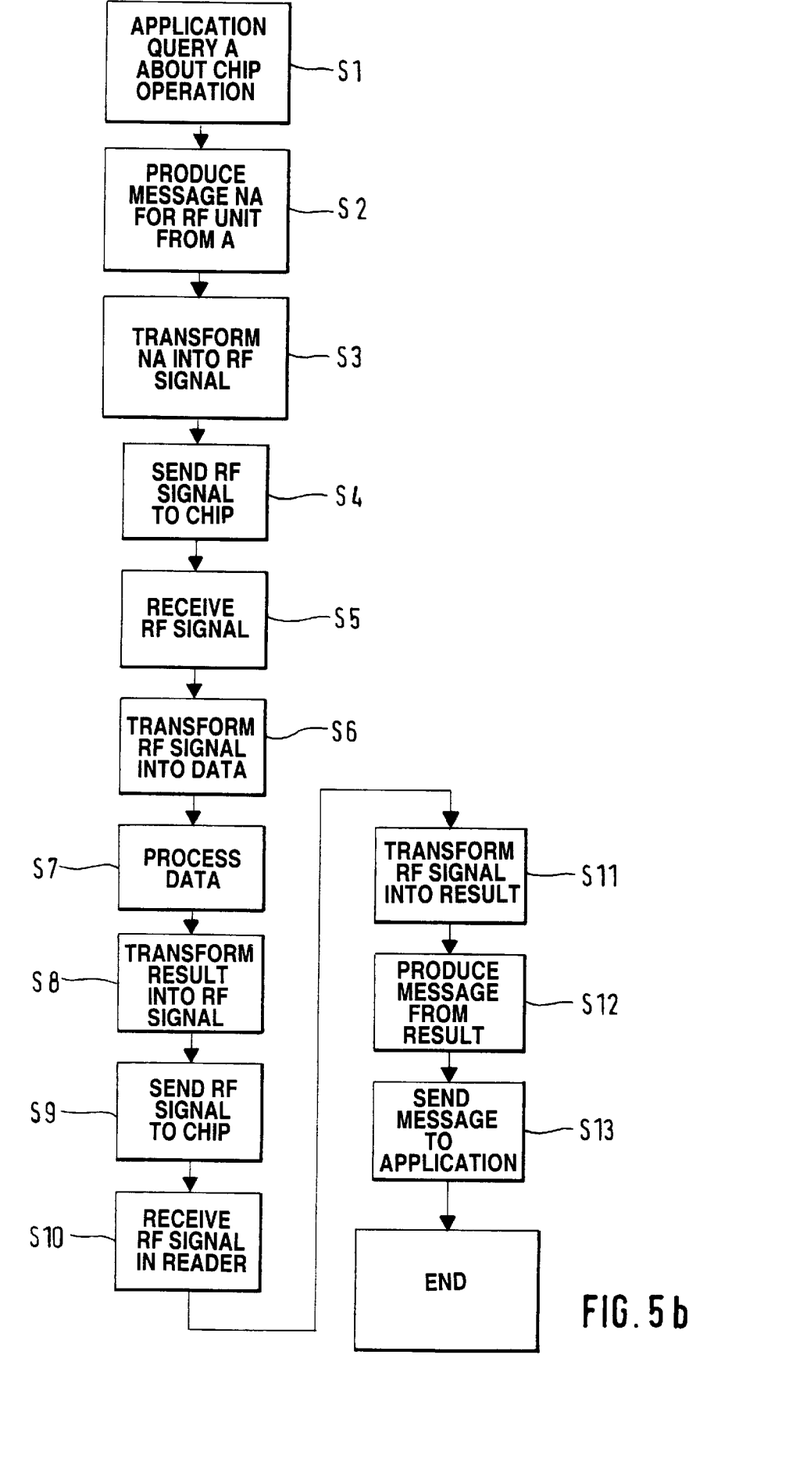

FIGS. 5a and 5b show communication between a data processing device and chip 12 integrated into CD-ROM 1 in case communication with chip 12 and communication with the CD readout device reading the information applied to the CD are effected via separate interfaces.

FIG. 5a shows schematically the elements involved in communication. The application program seeking to communicate with chip 12 is shown by block B1. Application program B1 is connected with chip driver B2 which can in turn access radiofrequency (RF) unit B3. A data bus or line B4 connects RF unit B3 with coupling device B5. The arrangement of RF unit B3 and data bus B4 can also be interchanged. Coupling device B5 consists of drive coupling element 51 and CD coupling element 11. Depending on the embodiment, contact surfaces 6 can also be added on CD-ROM 1 and contacts 68 on support-side pressure plate 65. Coupling device B5 is in turn connected with chip 12 of CD-ROM 1 which is shown schematically by block B6 in FIG. 5a.

FIG. 5b shows a flow chart to illustrate the operational sequences in communication between the data processing device and chip 12 integrated in CD-ROM 1. The flow diagram will be explained with reference to the block diagram shown in FIG. 5a. In first step S1 it is ascertained that application program B1 has query A about a chip operation. Step S1 is followed by step S2 in which chip driver B2 produces from query A message NA for RF unit B3. Then, in step S3, message NA is transformed by RF unit B3 into an RF signal. In subsequent step S4 the RF signal is transmitted via coupling device B5 to chip 12 or block B6. In step S5, chip 12 or block B6 receives the RF signal, then transforming it into a data signal in step S6. The thus produced data signal is processed by chip 12 or block B6 in step S7, and the result of processing is transformed into an RF signal in step S8. The RF signal is transferred in noncontact fashion via coupling device B5 in steps S9 and S10. In subsequent step S11 the RF signal is transformed by RF unit B3 into a data signal. In step S12 chip driver B2 produces from the data signal a message which is transmitted to application program B1 in step S13. The query of application program B1 to chip 12 or block B6 is thus answered.

The content of query A of the application program depends on what application chip 12 is used for and how chip 12 is included in the realization of this application.

A possible application consists for example in access or execute protection for information or programs stored on CD-ROM 1. In this case query A can relate to a key word necessary for continuing the program run or for retrieving information, or to a branch address at which the program is to be continued. Query A can also relate to a key or algorithm necessary for decrypting the program code deposited in encrypted form or information stored in encrypted form. In this connection query A can also be a request to chip 12 to decrypt the program code or information or at least partly execute the program code. Execution of query A can be made contingent on the successful outcome of a thereby or previously performed authentication.

All hitherto stated applications have in common that chip 12 as the security element and CD-ROM 1 as the mass storage medium form one unit so that no problems occur in associating the particular security element with the corresponding mass storage medium and the security element cannot be lost as long one has the mass storage medium. Illegal copying or replication of the total unit is extremely difficult and thus unprofitable.

Chip 12 can also be used as an accounting medium for the programs or information stored on CD-ROM 1. For this purpose an amount is stored on chip 12 to permit a predetermined number of executions or accesses with respect to the programs or information stored on CD-ROM 1, or downloading of a predetermined amount of data or an unlimited number of executions of selected programs or an unlimited number of accesses to selected information, in each case corresponding to the value of the stored amount. The amount can be paid for example with the purchasing price of CD-ROM 1 or as a fee for rented CD-ROM 1. The amount can further be increased by later payments, or a fully or partly spent amount restored by payments. The amount can also be stored on a cash chip which gives the CD chip an instruction to enable the information or program after receipt of the payment.

In a further application, the information stored on chip 12 can be retrieved or changed by means of query A. Such information can be for example personal settings for the program stored on the CD-ROM, or temporary results of calculations performed with the program, or scores if a game program is involved.

In another application, chip 12 is caused by query A to perform calculations, for example generate a random number or digital signature or check an identifier.

Figure 6A:
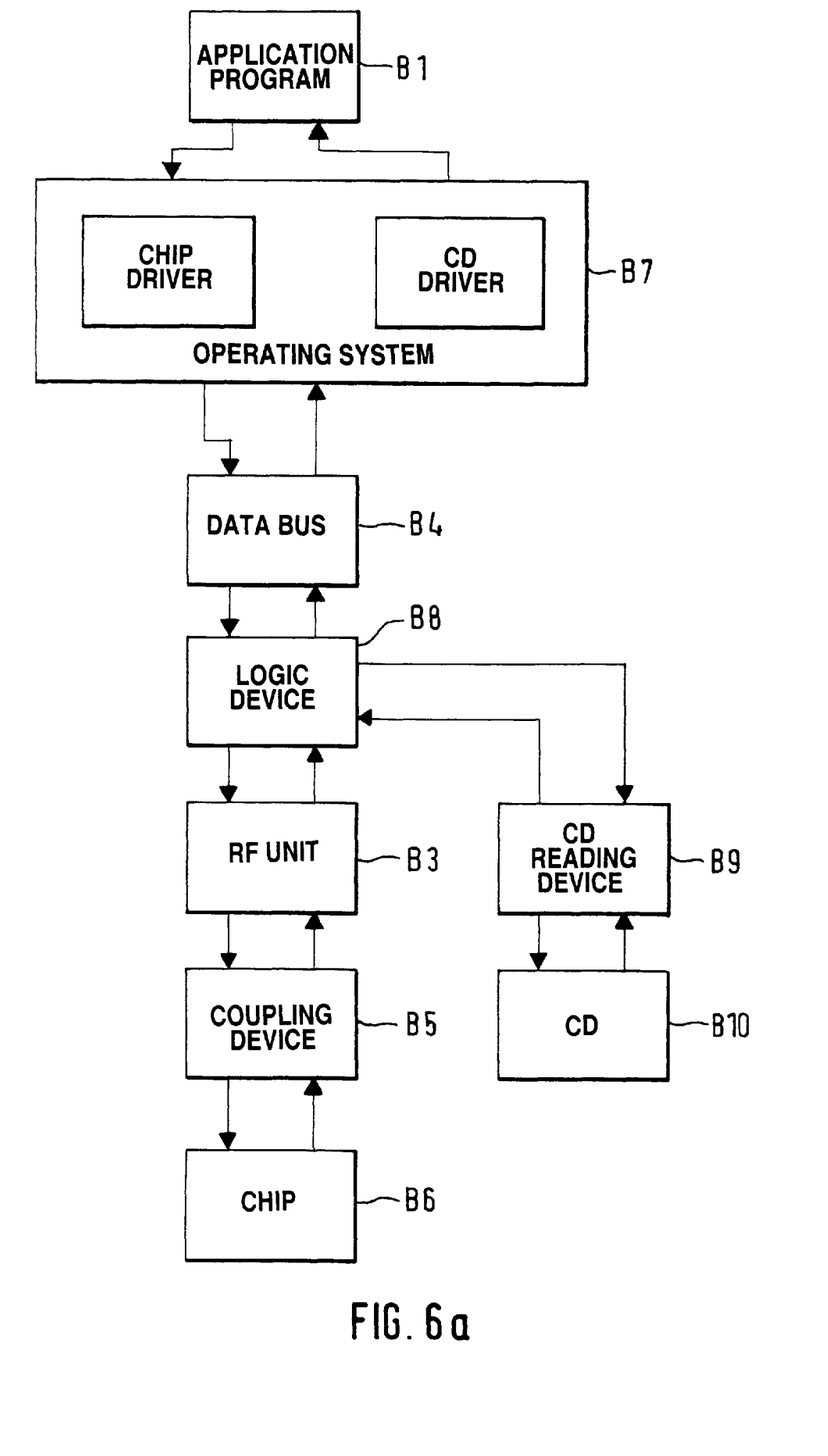
FIGS. 6a, 6b show a block diagram and flow chart for a further possibility of communication between the inventive CD-ROM and the data processing device.
Figure 6B:
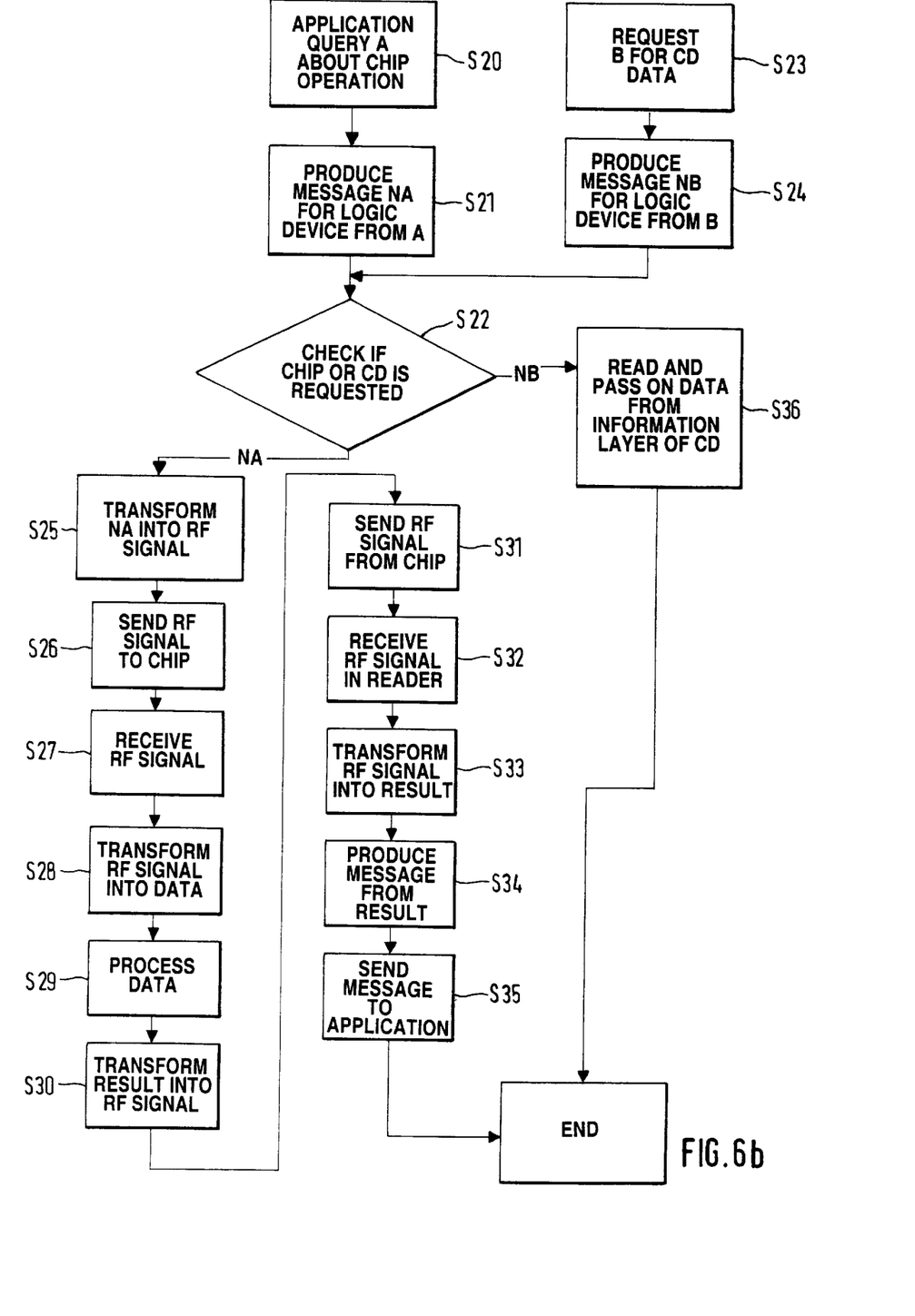

FIGS. 6a and 6b show a second way of effecting communication between the data processing device and chip 12 integrated in CD-ROM 1. In this case CD readout device B9 and coupling device B5 are connected with the data processing device via common CD data bus B4 (e.g. an SCSI bus or ISA bus), i.e. only one interface is present for communication with chip 12 or block B6 and CD readout device B9. CD data bus B4 branches in logic device B8 only within the CD drive. In logic device B8 all signals sent with CD data bus B4 are then checked as to whether they are communication signals for CD-ROM chip 12 (block B6) or signals for CD readout device B9. The addresses of the communication signals for chip 12 (block B6) correspond to those CD-ROM addresses which are not realized on CD-ROM 1 (block B10). The addresses intended for chip 12 (block B6) are then passed on by logic device B8 to RF unit B3. In this embodiment, logic device B8 and RF unit B3 are thus housed in the CD drive as separate components.

Specifically, application program B1 is coupled with data bus B4 via operating system B7 comprising a chip driver and a CD driver. Data bus B4 leads to logic device B8 and from there via RF unit B3 and coupling device B5 to chip 12 or block B6, on the one hand, and via CD readout device B9 to CD-ROM 1 or block B10, on the other hand.

In a variant in which communication between the data processing device and chip 12 (block B6) integrated in CD-ROM 1 is performed with the aid of CD readout device B9, the branch provided in FIG. 6a for coupling with chip B6 is omitted. That is, RF unit B3 and coupling device B5 are not required. The mode of operation of logic device B8 is modified insofar as it controls CD reading device B9 in each case. However, the manner of control depends on whether communication is to take place with CD B10 or with chip B6. Accordingly, CD readout device B9 is controlled so as to make contact with CD B10 or with chip B9.

The variant described here presupposes that data exchange with chip B9 can be effected optically. A number of embodiments of CD B10 permitting optical communication with chip B6 will be described in more detail below. In all embodiments with optical coupling of chip B9, it is fundamentally possible to use a chip with optical signal processing instead of a conventional chip with electric signal processing. This also depends substantially on the future progress made in the development of optical chips.

FIG. 6b shows a flow chart to illustrate the operational sequences in communication between the data processing device and chip 12 integrated in CD-ROM 1, or the CD readout device. The following description will make reference to the block diagram shown in FIG. 6a. In first step S20, application program B1 makes query A about a chip operation. In following step S21 the chip driver (block B7) produces from query A message NA which is passed on via data bus B4 to logic device B8. Step S21 is followed by query S22 in which logic device B8 checks whether communication is desired with chip 12 (block B6) or with CD-ROM 1 (block B10), i.e. whether message NA or message NB is present. Message NB is produced by the CD driver in step S24 if request B for CD data is made in preceding step S23. Message NA and message NB can be differentiated for example by the addressing.

If the query in step S22 yields that message NA for chip 12 or block B6 is present, step S25 follows in which signal NA is transformed by RF unit B3 into an RF signal. In subsequent step S26 the RF signal is sent with coupling device B5 to chip 12 or block B6. In step S27 chip 12 or block B6 receives the RF signal, transforming it in following step S28 into data which are processed further in step S29. The result of processing is transformed in step S30 into an RF signal and then transmitted through coupling device B5 in steps S31 and S32. In step S33, RF unit B3 transforms the RF signal into a data signal. The data signal is converted by the chip driver (block B7) into a message in step S34 and transmitted to application program B1 in step S35. With step S35 query A of application program B1 is answered and the run of the flow diagram completed.

If it is ascertained in query S22 that message NB is present, expressing request B for CD data, query S22 is followed by step S36 in which CD readout device B9 reads the desired data from CD-ROM 1 or block B10 and transmits them to application program B1. With step S36 request B for CD data is met so that the run of the flow diagram is completed.

In the variant shown in FIGS. 6a and 6b it is possible to play inventive CD-ROM 1 with integrated chip 12 in existing CD drives. One need merely plug an additional PC card into the PC and dispose drive coupling element 51 and a connection between drive coupling element 51 and the PC card in the CD drive. One must also load a corresponding chip driver. In the case of optical coupling of chip 12 via the CD readout device one can omit drive coupling element 51 since its function can be performed by the CD readout device.

In the case of optical coupling of chip 12, CD coupling element 11 can be implemented in different ways. CD coupling element 11 can be implemented for example so as to directly receive the light used for coupling and—if electric chip 12 is used—convert it into corresponding electric signals which are supplied to chip 12. If optical chip 12 is used, there is no conversion into electric signals. Like the reception of light, emission can also be performed directly by CD coupling element 11. CD coupling element 11 can be an integral part of chip 12 or be disposed preferably in the inner area of CD-ROM 1 as a separate component.

Figure 7A:
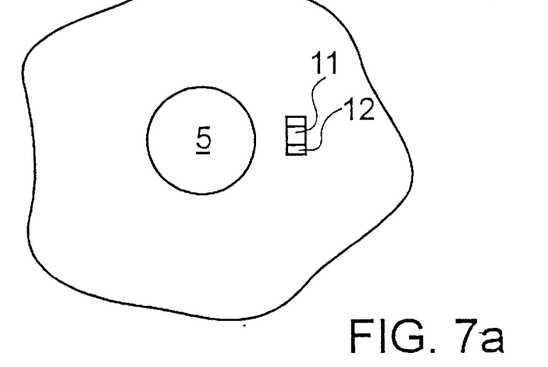
FIGS. 7a, 7b, 7c show details of the CD-ROM in plan view for different embodiments of an optical CD coupling element.
Figure 7B:
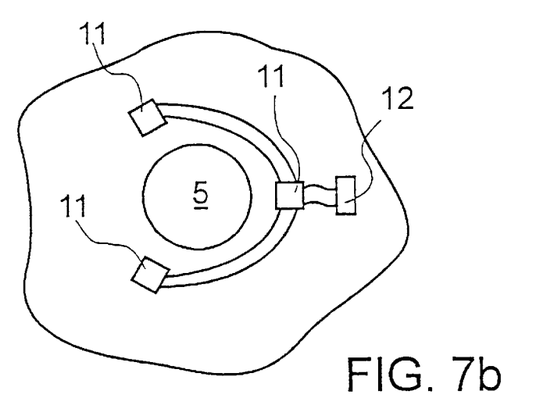
Figure 7C:
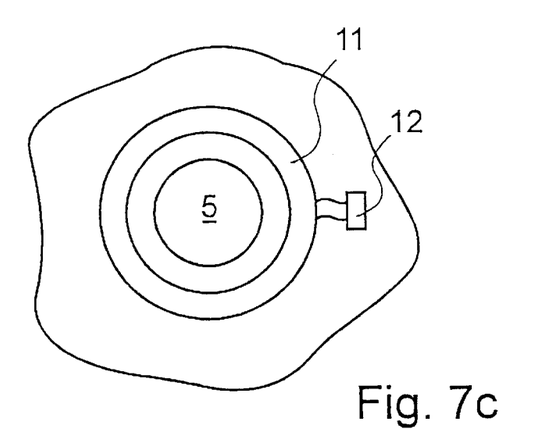

Three embodiments for CD coupling element 11 in case of direct optical coupling are shown in FIG. 7. One sees in each case in plan view the inner area of CD-ROM 1 in which CD coupling element 11 is disposed.

FIG. 7a shows CD coupling element 11 implemented as an integral part of chip 12. This embodiment is very compact and also easy to build into CD-ROM 1. However, one must make sure CD coupling element 11 is disposed on the surface of CD-ROM 1 or covered by transparent material. When operating CD-ROM 1 one must further make sure the data transfer between CD coupling element 11 and the CD readout device takes place in a time-slot pattern synchronized with the rotation of CD-ROM 1 since CD coupling element 11 is in visual contact with the sensitive surface of the CD readout device for only a short period of time during each revolution of CD-ROM 1.

FIG. 7b shows coupling elements 11 disposed on CD-ROM 1 as separate components. Three CD coupling elements 11 are shown by way of example which are disposed on the same radius and equidistantly spaced. If one uses a plurality of CD coupling elements 11, this shortens the gaps in the time-slot pattern during which no data transfer is possible. The length of the gaps depends on, among other things, the radius on which CD coupling elements 11 are disposed, the rotation of CD-ROM 1 and the number and size of CD coupling elements 11. Depending on the requirements of the individual case, one will therefore mount either one CD coupling element 11 or a plurality of CD coupling elements 11 on CD-ROM 1.

FIG. 7c shows large-surface CD coupling element 11 having the form of a circular disk. The embodiment of CD coupling element 11 shown in FIG. 7c permits continuous data transfer without interruption.

Besides direct transfer of light to or from CD coupling element 11, it is also possible to supply light to CD coupling element 11 by means of optical auxiliary element 14, or pass on the light emitted by CD coupling element 11 by means of optical auxiliary element 14. In this way it is for example possible to form CD coupling element 11 as an integral part of the chip and nevertheless permit continuous data transfer to chip 12. This can be obtained if the light emitted by the CD readout device is received and supplied to CD coupling element 11 by large-surface optical auxiliary element 14. Further, the use of optical auxiliary element 14 makes it possible to embed CD coupling element 11 in CD-ROM 1 without regard for a direct visual connection with the CD readout device since the light is passed on via optical auxiliary element 14.

Figure 8:
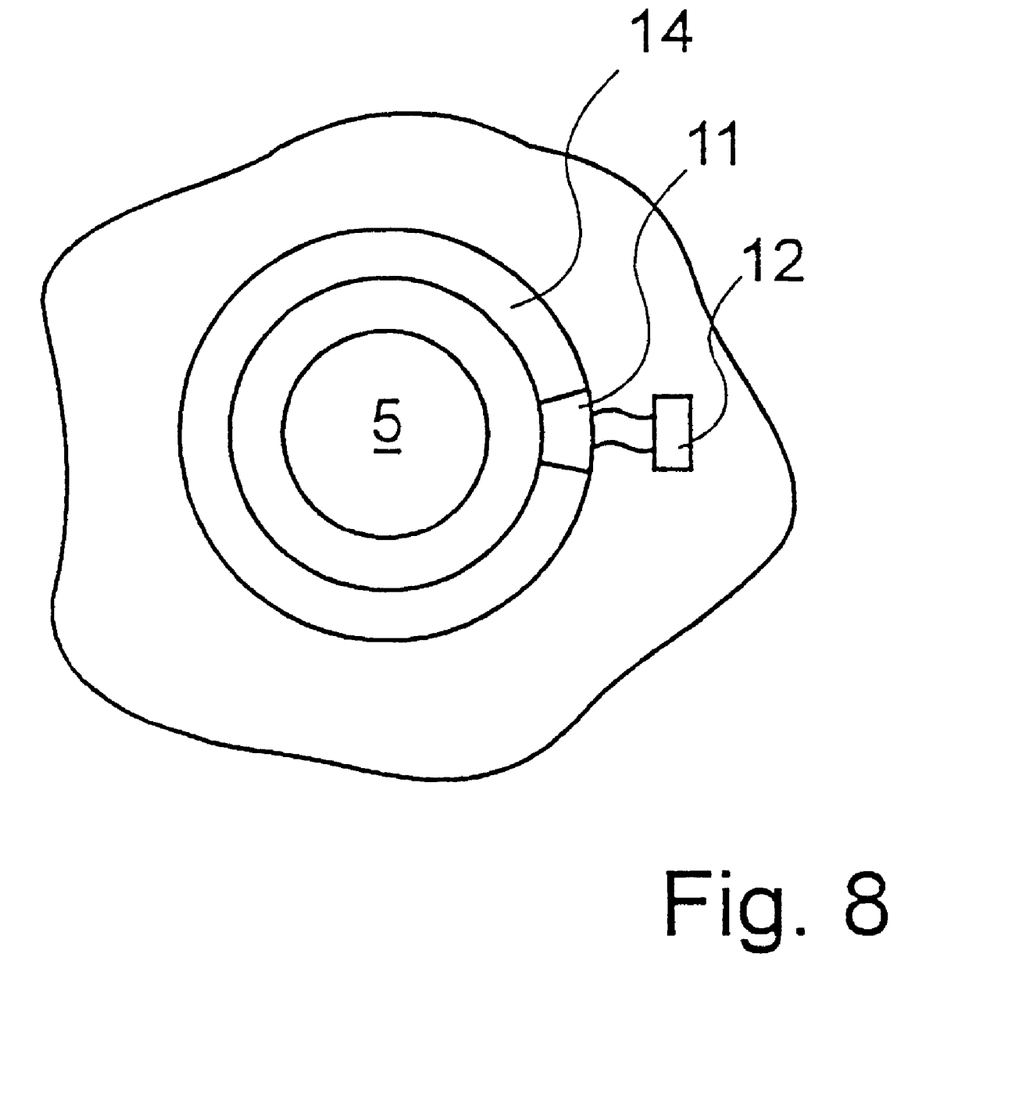
FIG. 8 shows a detail of the CD-ROM with an optical CD coupling element preceded by an optical auxiliary element.

An embodiment with optical auxiliary element 14 is shown in FIG. 8. Optical auxiliary element 14 is executed here as an optical foil having the form of a circular disk and being applied to the surface of CD-ROM 1 or integrated into the surface. CD coupling element 11 is added to the circular disk as a segment so that the light collected by optical auxiliary element 14 can readily be passed on to CD coupling element 11. Depending on the application, optical auxiliary element 14 can also be formed differently and a plurality of optical auxiliary elements 14 can also be used.

In all embodiments for optical coupling of chip 12, light can be transmitted and received either by one and the same CD coupling element 11 and optionally via optical auxiliary element 14, or different CD coupling elements 11 or different areas of CD coupling element 11 and optionally optical auxiliary elements 14 can be used for transmitting and receiving light. The embodiment shown in FIG. 7c could thus be modified so that annular CD coupling element 11 has ring segments for receiving light and ring segments for transmitting light. A further modification could be such that CD coupling element 11 consists of a plurality of concentric rings, at least one ring being designed to transmit light and at least one ring to receive light.

The way CD coupling element 11 is realized technically depends on factors such as desired data transfer rate, required reliability and service life, permissible price, etc. For receiving light it is suitable to use for example photodiodes or phototransistors, infrared sensors, solar cells, etc. For emitting light it is suitable to use for example electrically excitable elements such as light-emitting diodes, optically excitable elements or elements whose reflection behavior is controllable, such as liquid crystal displays.

If data exchange is to take place with CD-ROM 1 and chip 12 simultaneously, it is recommendable, even in the case of optical CD coupling element 11, to perform data exchange with chip 12 not via the CD readout device but via a separate device. This separate device can be disposed on the front, back or both sides of CD-ROM 1. CD coupling element 11 or optical auxiliary element 14 is to be disposed accordingly.

In the CD drives described here one can also play conventional CD-ROMs, i.e. the drives are downward compatible. CD-ROMs 1 with chip 12 can likewise be played with conventional drives in applications requiring no access to the chip.

What is claimed is:

1. A data carrier in the form of a CD comprising a circular CD body with an information-carrying layer, the CD having a chip integrated thereinto wherein at least one CD coupling element for noncontact transfer of data between the chip and a data processing device is also integrated into the CD, and wherein power required for operating the chip is transferred to the chip via the at least one CD coupling element.

2. The CD of claim 1, wherein the chip and the CD coupling element are disposed between a center hole of the CD and an innermost data track.

3. The CD of claim 1, wherein the chip and the CD coupling element are potted by means of resin to form a module.

4. The CD of claim 3, wherein the CD body has a gap in which the module is inserted.

5. The CD of claim 3, wherein the module is molded by surrounding material of the CD body.

6. The CD of claim 1, wherein on the chip data are stored without which the information stored on the CD cannot be processed, or not processed correctly.

7. The CD of claim 6, wherein the stored data are keys for decrypting the information stored on the CD.

8. The CD of claim 7, wherein the chip is arranged to store user-specific settings of a program stored on the CD.

9. The CD of claim 1, wherein the chip stores an amount serving to pay for use of information stored on the CD.

10. The CD of claim 1, wherein the CD coupling element for noncontact transfer of data and power consists of at least one coil.

11. The CD of claim 10, wherein the coil is a wound coil or consists of a thin metal layer.

12. The CD of claim 1, wherein the CD coupling element for noncontact transfer of data between the chip and the data processing device is a capacitive coupling surface formed by a thin metal layer, and wherein a further thin metal layer is provided for the transfer of power.

13. The CD of claim 1, wherein the CD coupling element for noncontact transfer of data and power includes at least one optical coupling element.

14. The CD of claim 13, wherein the optical coupling element is connected with an optical auxiliary element which passes on the light used for optical data transfer to the optical coupling element.

15. An apparatus for communications between a CD and a data processing device, said CD comprising a circular CD body with an information-carrying layer the CD having a chip integrated thereinto wherein at least one CD coupling element for noncontact transfer of data between the chip and a data processing device is also integrated into the CD, and wherein power required for operating the chip is transferred to the chip via the at least one CD coupling element the apparatus including a CD drive with a device for rotating the CD and with a CD readout device for reading the information from the rotating CD, wherein the CD drive has a drive coupling element for noncontact transfer of data from and to the chip of the CD via the CD coupling element, as well as for transfer of power to the chip of the CD.

16. The apparatus of claim 15, wherein the drive coupling element is formed as an element selected from the group consisting of a coil, a capacitive coupling surface, and an optical coupling element.

17. The apparatus of claim 15, wherein the CD readout device performs the functions of the drive coupling element.

18. The apparatus of claim 16 or 17, wherein a logic device is provided with which the drive coupling element and the CD readout device are connected via separate interfaces, and which has at least one interface for connection with the data processing device, the logic device being designed so as to pass on the data from the data processing device in accordance with their addressing to one of the drive coupling element and the CD readout device.

19. The apparatus of claim 15, wherein the chip and the CD coupling element are disposed between a center hole of the CD and an innermost data track.

20. The apparatus of claim 19, wherein the chip and the CD coupling element are potted by means of resin to form a module.

21. The apparatus of claim 19, wherein the CD body has a gap in which the module is inserted.

22. The apparatus of claim 15, wherein the module is molded by surrounding material of the CD body.

23. The apparatus of claim 15, wherein on the chip data are stored without which the information stored on the CD c an not be processed, or not processed correctly.

24. The apparatus of claim 23, wherein the stored data are keys for decrypting the information stored on the CD.

25. The apparatus of claim 24, wherein the chip is arranged to store user-specific settings of a program stored on the CD.

26. The apparatus of claim 15, wherein the chip stores an amount serving to pay for use of information stored on the CD.

27. The apparatus of claim 15, wherein the CD coupling element for noncontact transfer of data and power consists of at least one coil.

28. The apparatus of claim 27, wherein the coil is a wound coil or consists of a thin metal layer.

29. The apparatus of claim 15, wherein the CD coupling element for noncontact transfer of data between the chip and the data processing device is a capacitive coupling surface formed by a thin metal layer, and wherein a further thin metal layer is provided for the transfer of power.

30. The apparatus of claim 15, wherein the CD coupling element for noncontact transfer of data and power includes at least one optical coupling element.

31. The apparatus of claim 30, wherein the optical coupling element is connected with an optical auxiliary element which passes on the light used for optical data transfer to the optical coupling element.

32. The CD of claim 6, wherein the stored data are algorithms for decrypting the information stored on the CD.

33. The apparatus of claim 23, wherein the stored data are algorithms for decrypting the information stored on the CD.

34. The CD of claim 7, wherein the chip is arranged to store temporary results of calculations.

35. The apparatus of claim 24, wherein the chip is arranged to store temporary results of calculations.

* * * * *